March 25, 1969  C. E. LYALL  3,434,490
CHEMICAL SOLUTION FEEDER
Filed May 17, 1968  Sheet 1 of 3
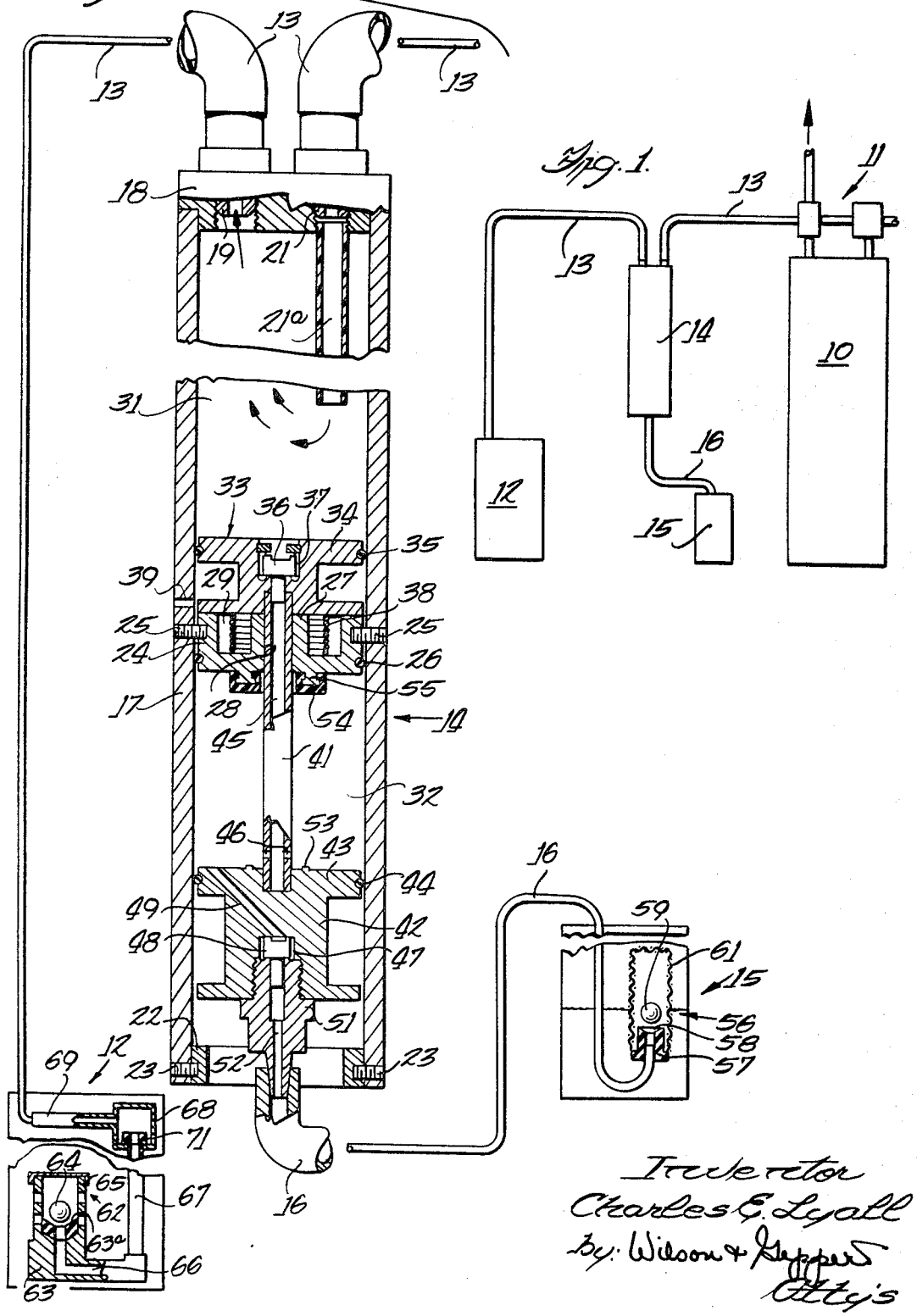

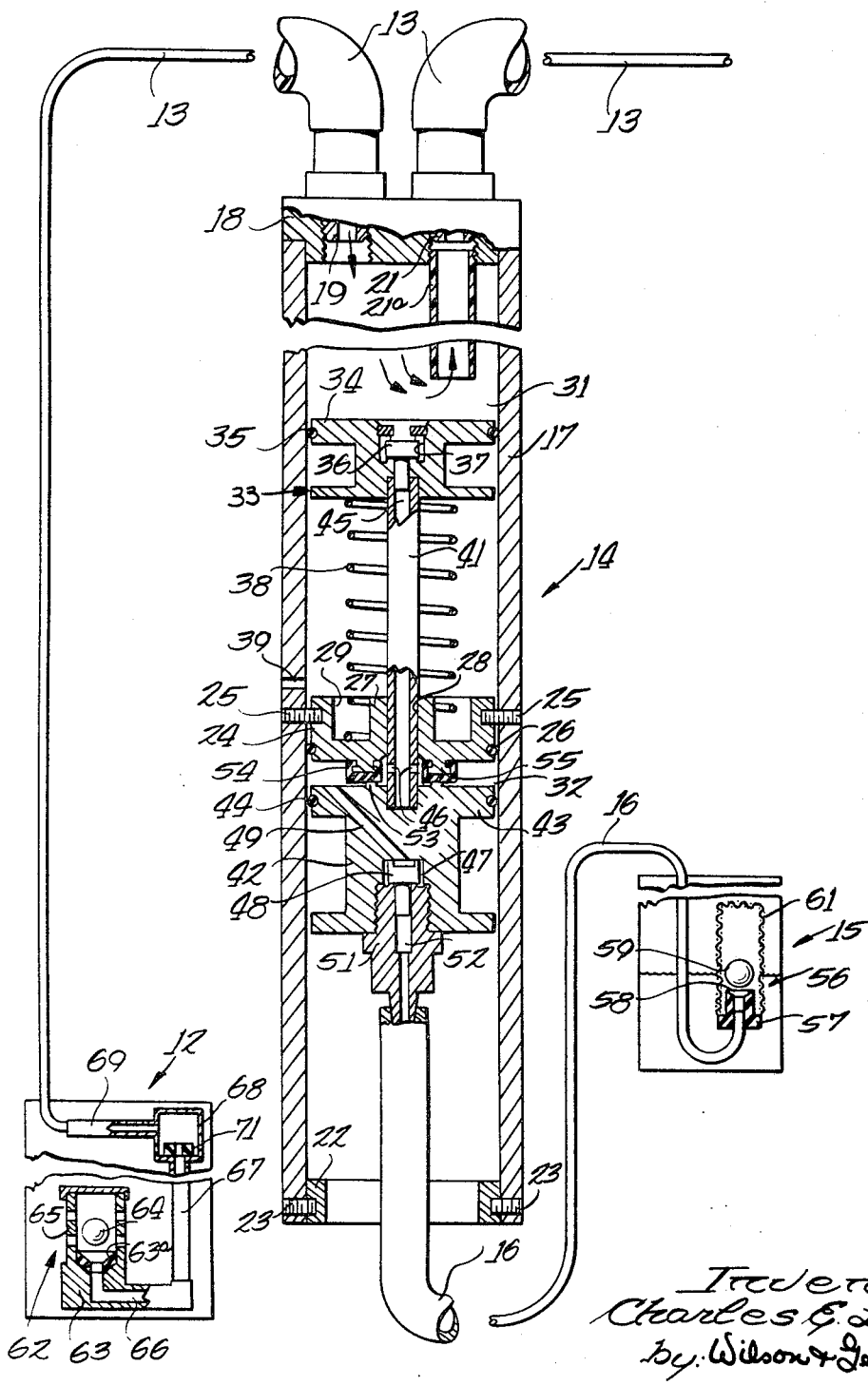

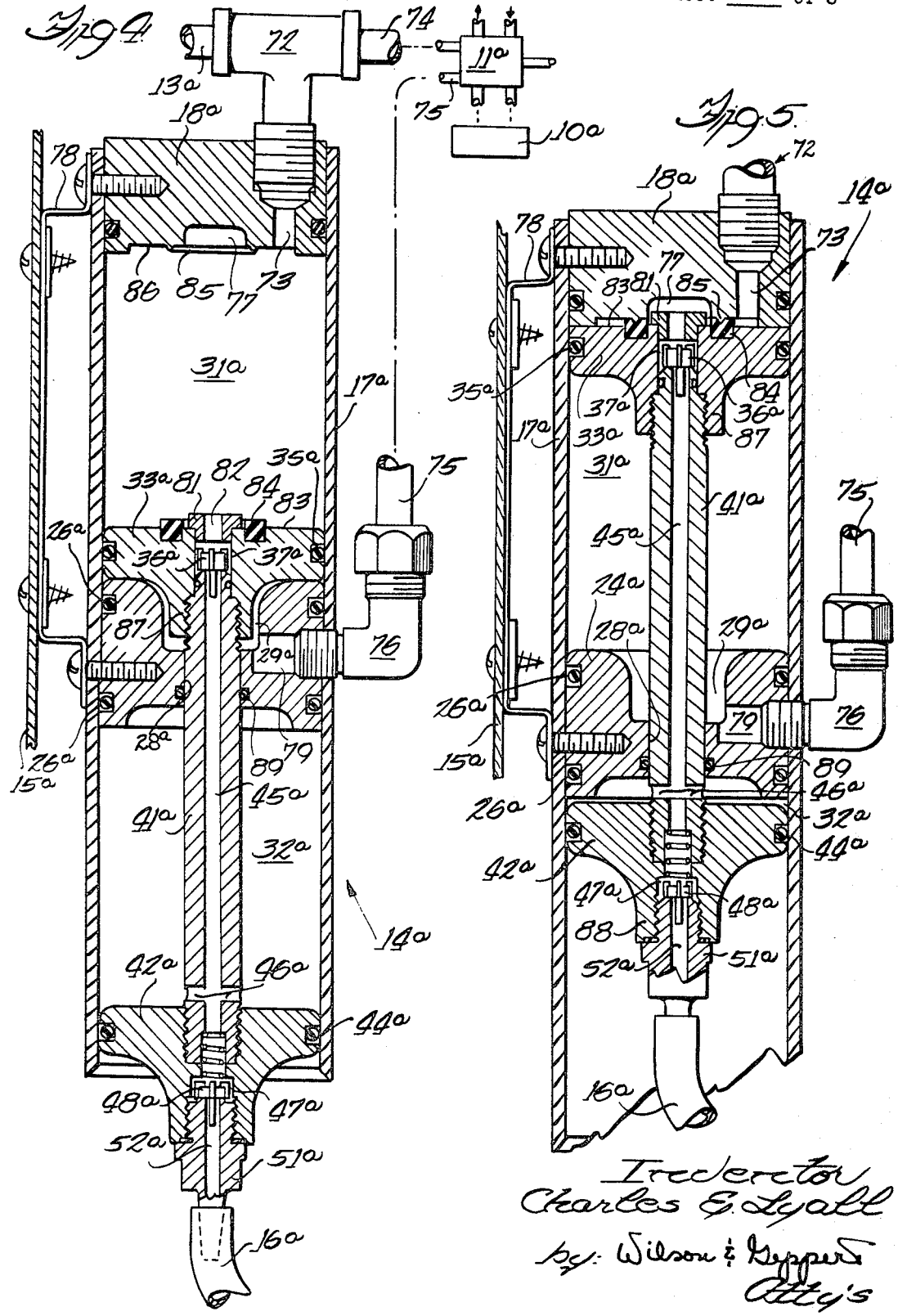

United States Patent Office 3,434,490
Patented Mar. 25, 1969

3,434,490
CHEMICAL SOLUTION FEEDER
Charles E. Lyall, Deerfield, Ill., assignor to Culligan, Inc.,
Northbrook, Ill., a corporation of Delaware
Continuation-in-part of application Ser. No. 557,504,
June 14, 1966. This application May 17, 1968, Ser.
No. 730,680
Int. Cl. F16k 15/18, 17/36, 21/00
U.S. Cl. 137—101.31      14 Claims

ABSTRACT OF THE DISCLOSURE

A chemical solution feeder interposed in the line from a water conditioner control valve to a regenerant storage tank so that the chemical solution from the feeder will be fed into the water conditioner during the initial flow of regenerant, the feeder having a metering chamber communicating with a source of the chemical solution and an upper chamber with an outlet connected in the line extending between the control valve and the regenerant tank. A pair of reciprocable pistons, one in each chamber, are joined by a rigid transfer tube communicating between the chambers, and the upper chamber includes a positive moving means to bias the pistons upward in their chambers.

---

The present invention is a continuation-in-part of my copending application Ser. No. 557,504, filed June 14, 1966 now abandoned.

The present invention relates to a chemical solution feeder and more particularly to an automatic feeding device to add a predetermined amount of a chemical solution to the brine for a water softener during regeneration of the ion exchange resin.

Normal water softener regeneration through the use of a sodium chloride solution does not always either fully regenerate the resin or remove any undesirables from the resin bed. Of particular importance is the problem of iron in the water being treated which has a tendency to coat the resin beads and becomes difficult to remove. Thus, it becomes desirable to treat the resin with a predetermined quantity of a suitable chemical in the early stages of the brine regeneration to combat the problems of iron fouling and to aid in the efficiency of the regeneration, and the need for an automatic feeding device for such chemical during regeneration thus becomes critical.

Among the objects of the present invention is the provision of an automatic chemical solution feeding device which will provide a predetermined or metered quantity of a chemical solution for each regeneration cycle of a water softener. The device includes a metering chamber communicating with a source of the chemical solution additive and an upper or feeding chamber communicating with the regenerant flow from a source of regenerant to a water softener. The metering and feeding chambers communicate with each other through a valved passageway.

Another object of the present invention is the provision of an automatic chemical solution feeding device for a metered quantity of chemical solution having a pair of spaced pistons joined together to reciprocate simultaneously and three separate and independently acting valves in the device to meter the chemical solution from a suitable source and position it in the path of the regenerant flow to the softener. The device has a generally central partition separating the upper chamber from the metering chamber, and a piston is located in each chamber. The pistons are joined by a rigid tube having a communicating passage therein. Each piston includes a reciprocable check valve therein to control liquid flow therethrough, and a third valve includes a resilient annular member on the lower surface of the partition cooperating with an annular projection on the lower piston.

A further object of the present invention is the provision of an automatic chemical solution feeding device in which operation of the spaced pistons in the device is based on the three pressure stages of the softener and regeneration tank during a service and regeneration cycle. Under the high pressure of water refilling the brine tank at the start of a service cycle, the pistons are forced downward drawing chemical solution into the metering chamber. When normal pressure occurs once the water supply is shut off, a spring-biasing means forces the pistons upward transferring the metered solution into the upper chamber. When a vacuum occurs in the control valve for the water softener for eduction of brine, the chemical solution is drawn out of the upper chamber with the brine to the water softener for regeneration of the resin.

The present invention also comprehends the provision of an automatic chemical solution feeding device for a measured quantity of chemical solution having a pair of spaced pistons joined together by a hollow tube to reciprocate simultaneously and a source of fluid pressure communicating with the upper chamber below the piston therein to positively urge the piston upward and feed the metered quantity of chemical solution into the flow of regenerant. The fluid pressure source is the water conditioner control valve when the valve is pressurized for the regeneration cycle.

The present invention further comprehends the provision of an automatic chemical solution feeding device for a measured quantity of chemical solution where each piston includes a check valve therein to control the flow of chemical solution in the feeding device. Also, a third valve includes a resilient annular member located in the upper surface of the upper piston cooperating with an annular projection on the upper end wall of the upper chamber.

Further objects are to provide a construction of maximum simplicity, efficiency, economy and ease of assembly and operation, and such further objects, advantages and capabilities as will later more fully appear and are inherently possessed thereby.

In the drawings:

FIG. 1 is a schematic view of an automatic water softening apparatus with the automatic chemical feeding device inserted in the conduit between the water softener and the brine tank.

FIG. 2 is a generally vertical cross sectional view of the automatic feeding device shown in the metering position, with schematic showings of the brine and chemical solution tanks.

FIG. 3 is a generally vertical cross sectional view similar to FIG. 2 but showing the components in the position for adding the solution to the regenerant stream.

FIG. 4 is a generally vertical cross sectional view of another embodiment of automatic feeding device shown in the metering position.

FIG. 5 is a generally vertical cross sectional view similar to FIG. 4, but showing the device in the position after adding the chemical solution to the regenerant flow.

Referring more particularly to the disclosure in the drawings wherein are shown illustrative embodiments of the present invention, FIG. 1 discloses a water softening or conditioning tank 10 having an automatic directional control valve 11 thereon providing for the service and regeneration cycles of the softener 10. A regenerant or brine tank 12 communicates with the softener through a conduit 13, and an automatic chemical solution feeding device 14 is interposed in the conduit 13. The feeding device 14 is connected to a chemical solution tank 15 through a second conduit 16. A suitable directional control valve 11 for the softener is disclosed in the Robert E. Sculze et al. Patent No. 3,083,-728, entitled "Four-Stage Automatic Valve For A Water Softener or Conditioner." This valve 11 would be modified by a time actuated brine refill valve in the brine conduit 13 as disclosed in the Donald A. Mahlstedt et al. Patent No. 3,146,788, where refill water is admitted to the brine tank over a predetermined time interval and at a predetermined rate of flow and then the water pressure to the tank 12 is terminated.

Now considering more particularly the metering device 14, as seen in FIGS. 2 and 3, the device includes a cylindrical body 17 having an upper closed end 18 secured thereto and provided with fittings 19 and 21 connected in the conduit 13; the fitting 21 having a dip tube 21a extending downward into the body 17. An annular ring 22 is secured to the interior wall of the body 17 at the lower end thereof by suitable means such as set screws 23. Also, a generally central partition 24 is secured in the body by set screws 25, and the partition is sealed in the body by the sealing O-ring 26 received in an annular groove in the periphery of the partition. The partition 24 is generally cup-shaped with a central annular flange or collar 27 extending upwardly and defining a central passage 28 through the partition. The flange 27 also defines an annular recess 29 formed in the cup-shaped partition for a purpose to be later described.

The partition 24 defines an upper or feeding chamber 31 between the partition and the upper end 18 and a metering chamber 32 below the partition. A double-flanged piston 33 is mounted in the upper chamber with the upper flange 34 having a sealing O-ring 35 in its periphery in a suitable groove; the O-ring 35 having sliding sealing or wiping contact with the interior wall of the cylindrical body 17. The piston 33 includes a reciprocable check valve 36 in a central passageway 37 in the piston cooperating with a raised annular valve seat to allow liquid flow upward through the piston into the upper chamber 31 and preventing downward flow therethrough. A compression spring 38 having its lower end seated in the annular recess 29 in the partition 24 contacts and yieldably biases the piston 33 upwardly away from the partition. The cylindrical body 17 also includes an air vent 39 in the wall thereof above the partition 24 but below the lowest position of the sealing O-ring 35 in the chamber 31.

A rigid tube 41 is secured at one end in the lower end of the passageway 37 in the piston 33 and depends downwardly into and through the central passage 28 in the partition 24 and is secured at its opposite end in the upper face of a second double-flange piston 42 positioned in the metering chamber 32. This piston also has a peripheral groove in the upper flange 43 receiving a sealing O-ring 44 in sliding sealing engagement with the interior wall of the cylindrical body 17. The rigid tube 41 provides a central passage 45 communicating with the metering chamber 32 through radial openings 46 adjacent the lower end thereof, and with the upper chamber 31 through the passageway 37 in the piston 33.

The lower piston 42 has a valve chamber 47 therein for a reciprocable check valve 48 cooperating with a raised annular valve seat, the chamber communicating with the metering chamber 32 through an offset or slanting passage 49. Also, a fitting 51 is threadingly secured in the lower end of the piston 42 and has a central passage 52 communicating with the valve chamber 47. The second conduit 16 leading to the chemical solution tank 15 is secured to the depending opposite end of the fitting 51 and is sufficiently flexible to allow for movement of piston 42. The upper surface of the lower piston 42 also has an annular ridge or projection 53 cooperating with an annular resilient valve seat 54 secured onto an annular depending flange 55 on the lower surface of the partition 24.

The chemical solution tank 15 is provided with an air check valve 56 having a resilient base 57 into the bottom of which is secured the conduit 16, and a valve seat 58 on the upper end of the base for a buoyant air check ball valve 59. A cylindrical screen 61, closed at the top encompasses the upper portion of the base to filter out any impurities in the solution leaving the tank. Likewise, the brine tank 12 includes an air check valve 62 extending up from a housing 63 and having a valve seat 63a for a buoyant air check ball valve 64 retained in a slotted cage 65. The housing 63 includes a passage 66 extending therethrough and communicating with a vertical tube 67 extending up to an enlarged housing 68 having a lateral tubular extension 69 connected to the conduit 13. The housing 68 encloses a resilient flow control or restrictor 71 which limits flow into the tank 12 but can be lifted by reverse flow to allow substantially unlimited flow from the brine tank to the softener.

Considering the operation of the water softener 10 with the automatic chemical solution deivce 14 during a complete service and regeneration cycle of the softener, FIG. 3 discloses the feeding device 14 at normal rest position where the pistons 33 and 42 are in their upper positions and a metered amount of the chemical solution is in the upper or feeding chamber 31. Also, the brine tank 13 has sufficient brine therein for a regeneration cycle, and the softener tank 10 and flow control valve 11 are in the service cycle.

When the ion exchange resin in the water softener tank 10 becomes exhausted, the timer for the control valve 11 actuates the valve to a backwash position for an upflow expansion and washing of the resin bed with the effluent passing to a drain, and then to a downflow brine cycle where an eductor creates a vacuum in conduit 13 to draw the brine from the brine tank 12 to and through the softener tank 10. The brine leaving the tank 12 through passage 66, tube 67, housing 68, extension 69 and conduit 13 passes into the feeder 14 through fitting 19 and carries the chemical solution therewith through fitting 21 and dip tube 21a to the tank 10. It can be seen that the proportion of brine educted is much greater than the chemical solution in the chamber 31 so that all the chemical solution is transferred with the brine to the softener during the desirable initial or first stages of regeneration.

When the level of the brine reaches the resilient valve seat 63a in housing 63, the air check valve 64 seats on the valve seat 63a to prevent any air from being educted into the tank 10. When the brine is exhausted, water continues through the control valve 11 and the tank 10 to rinse the resin and remove any remaining traces of brine. When the rinse stage has been completed, the timer returns the control valve 11 to its original position, but permits the conduit 13 from the eductor to the brine tank 12 to remain open for a predetermined interval of time under line pressure of the untreated water inlet to the tank 10. This control of the conduit 13 is generally accomplished through a solenoid valve such as shown in the Mahlstedt et al. Patent No. 3,146,788, with the reciprocable flow control in the valve body omitted and located in the housing 68 of the brine valve.

As the line pressure in conduit 13 and the upper chamber 31 is greater than the force of the spring 38, the water under line pressure urges the check valve 36 to closed position on its valve seat and urges the piston 33 downward. As the piston 33 moves downwardly compressing the spring 38, air below the piston is vented through the opening 39. Simultaneously the piston 42 is also moved downwardly, but there is no vent for the metering chamber 32 and the chamber is sealed by the O-rings 24, 44. Therefore, a vacuum is created by downward movement of the piston 42; which vacuum draws the chemical solution from the tank 15 under atmospheric pressure through the second conduit 16 and passage 52 in the fitting 31, past the check valve 48 in chamber 47 which is lifted off of its valve seat and through passage 49 to fill the chamber 32.

Flow into chamber 32 continues until the piston 33 abuts the partition 24, as seen in FIG. 2, and the feeding device remains in that position until the solenoid valve closes the conduit 13 to liquid flow. As the water passing into the brine tank must pass through the flow control 71, the control 71 provides a constant flow rate for a set time interval resulting in a predetermined quantity of liquid entering the brine tank 12 to dissolve the salt therein forming concentrated brine. At the termination of flow to the brine tank 12 the feeding device is under atmospheric pressure, which pressure is less than the force of the compression spring. Therefore, the spring 38 begins to move the piston upward in the chamber 31.

In view of the connecting tube 41, upward movement of piston 33 causes upward movement of piston 42 thus compressing the chemical solution in the metering chamber 32 which in turn closes the check valve 48 on its valve seat. As the solution is noncompressible, upward movement of the piston 42 causes the solution to enter the passage 45 in tubing 41 through radial openings 46 and pass upward through the passage 45 lifting the check valve 36 to allow the solution to enter the upper chamber 31 displacing the water therein through the fitting 19 to the brine tank 12. The upward travel of piston 33 is controlled by the bleeding off of the water in the chamber 31 through the fitting 19 and conduit 13 to the brine tank 12 and through the flow control 71 in the housing 68.

The upward travel of the piston 33 thus can be effectively regulated by the orifice size of the flow control restrictor 71. The upward travel is regulated to be slow enough so that there is little or no mixing of the chemical solution being transferred from metering chamber 32 to the upper chamber 31 with the water then existing in chamber 31. As more volume is provided in chamber 31 than in metering chamber 32, there probably will be a layer of water above the layer of chemical solution when the piston 33 has reached its upper position as seen in FIG. 3. Travel of pistons 33 and 42 ceases when the annular ridge 53 on piston 42 abuts the sealing member 54 on the lower surface of the partition 24. The action of the spring 48 causes the annular ridge 53 to positively seat against the resilient valve seat 54 to prevent the vacuum in the chamber 31, created by a regeneration cycle, from drawing any chemical solution from the metering chamber 32 or the chemical solution tank or reservoir 15. The device is then in the position shown in FIG. 3 and is ready for another regeneration cycle.

The chemical solution is drawn through the conduit 16 into the metering chamber 32 by passing from the tank or reservoir 15 through the screen 61 past the ball valve 59 and through the base 57. If the level of the solution approaches that of the valve seat 58, the ball valve 59 will seat in the valve seat to prevent any air from being drawn into the metering chamber 32.

FIGS. 4 and 5 disclose another embodiment of solution feeder with identical parts having the same numeral as in the first embodiment with a superscript *a*. A feeding device 14a is interposed in a conduit 13a by a T connection 72 at a single inlet-outlet 73 on the device; the T 72 being connected to a conduit 13a leading to the brine tank and a conduit 74 leading to the control valve 11a. A conduit 16a from the lower end of the device 14a leads to the valve in the chemical solution tank 15a. A pressure conduit 75 also connects the control valve 11a to a fitting 76 for a purpose to be later described.

Considering the metering and feeding device 14a, the device includes a cylindrical body 17a with an upper closed end 18a having a central recess 77 and the offset outlet port 73 connected to the T connection 72. The device has a releasable bracket 78 secured thereto to hang the device within the upper end of the chemical solution tank 15a. A central partition 24a is suitably secured in the body and sealed therein by spaced O-rings 26a received in peripheral grooves in the partition. The partition has a central relatively deep recess 29a opening from a central passage 28a therethrough, and a lateral passage 79 extends through the partition and communicates between the central recess 29a and the fitting 76 extending through the side wall of the body 17a.

The partition 24a defines an upper chamber 31a between the partition and the upper end 18a and a metering chamber 32a. A reciprocable piston 33a is located in the upper chamber 31a and has a peripheral sealing O-ring 35a. This piston includes a central passageway 37a housing a reciprocable check valve 36a to allow liquid flow up through the piston to enter the reduced diameter passage 82 in a fitting 81 located in the upper end of central passageway 37a. The piston also includes an annular groove in the upper face 83 thereof receiving an annular sealing ring 84 which cooperates with an annular raised ridge 85 on the inner surface 86 of the upper end 18a surrounding the recess 77; the ring 84 and ridge 85 forming a valve whose purpose will be later described. The piston terminates in a depending annular flange 87 which is received in the recess 29a when the piston is in its lower position.

A rigid transfer tube 41a is secured within the depending flange 87 of the upper piston 33a communicating with the passageway 37a, and depends downwardly into and through the central passage 28a in the partition 24a and is secured at its lower end in the upper face of a second piston 42a located in the metering chamber 32a. As in the first embodiment, the tube 41a has a central passage 45a extending therethrough with radial openings 46a adjacent the lower end communicating with the chamber 32a. The lower open end of passage 45a communicates with the central valve chamber 47a in the piston 42a.

The piston 42a also has a sealing O-ring 44a received in a peripheral groove therein, a check valve 48a in the chamber 47a and a depending annular flange 88 receiving a fitting 51a having a central passage 52a communicating between the valve chamber 47a and the reservoir for the chemical solution via a conduit 16a. An O-ring 89 positioned in a groove in the surface of the passageway 28a in the partition 24a sealingly engages the tube 41a.

Considering the operation of this embodiment of feeding device, FIG. 4 discloses the feeding device 14a in the metering position with the chamber 32a filled with the chemical solution desired to be run through the softener during the initial stages of the regeneration cycle. When the water conditioner is exhausted and requires regeneration, a timer for the control valve 11a actuates the valve to a backwash position for an upflow expansion and washing of the resin bed in the tank 10a with the effluent passing to drain, and then to a downflow brine cycle where an eductor draws the brine from the brine tank through conduit 13a, T 72 and conduit 74 to and through the softener tank.

The conduit 75 connected to the fitting 76 is also connected to the control valve 11a to a port that is pressurized with fluid when the timer actuates the valve to shift to the brining position. This pressurized fluid passes through the conduit 75, fitting 76, and lateral passage 79 to the recess 29a to provide pressure beneath the upper piston 33a and tends to initially force the piston upward prior to vacuum being applied to the T connection 72. When the control valve 11a goes into its regeneration phase, vacuum is applied through conduit 74, T 72 and outlet 73 in the end 18a to provide a low pressure in the chamber 31a above the piston 33a. Due to the positive pressure below the piston 33a and the reduced pressure above the piston, the piston 33a and the lower piston 42a connected by transfer tube 41a will move toward an upward position.

The upward travel of the pistons forces the metered quantity of solution in metering chamber 32a through the radial openings 46a and up the passage 45a in the transfer tube 41a past the check valve 36a in the piston 33a into the chamber 31a above the piston and out through the outlet 73 and T 72 to the brine fitting on the water conditioner or softener; the pressure on the chemical solution in the metering chamber 32ª seating the check valve 48ª in the lower piston 42ª to prevent reverse flow to the chemical solution storage tank 15ª. The delivery rate of the chemical solution to the brine conduit 74 is at a volume lower than the capacity of the eductor; therefore, the solution flows to the softener 10ª rather than to the brine tank.

The pressure exerted through fitting 76 will move the upper piston 33ª upward until the annular ridge or seal 85 on the end 18ª has seated against the sealing ring 84 on the upper face 83 of the piston 33ª (FIG. 5). This seal 85 and sealing ring 84 cooperates to prevent the vacuum in conduit 74 from drawing more chemical solution up past the check valves 36ª and 48ª than the measured amount. The regeneration cycle will continue with the regenerant solution or brine passing through conduit 13ª, T 72 and conduit 74 until the brine valve in the brine tank seats to prevent air from entering the system. Then only water passes through the eductor into the tank 10ª to rinse the regenerated resin.

Upon completion of the regeneration cycle, the timer will deactivate the control valve 11ª thus stopping the source of water pressure available to conduit 75 and fitting 76 and no more pressure appears in the chamber 31ª below the piston 33ª. When the timer shifts the control valve to service operation and actuates the brine control valve to the brine tank refill position, water pressure is supplied to the conduits 74 and 13ª to the brine valve to refill the brine tank as regulated by a flow control in the brine valve. This water pressure also enters the chamber 31ª above the piston 33ª through the T 72 and outlet 73 to force the upper piston downward, which in turn forces the water below the piston out of the fitting 76 and conduit 75 to the control valve 11ª where it is bled off to drain. This pressure seats the check valve 36ª in piston 33ª and forces the piston to its fully lowered position shown in FIG. 4.

The downward movement of lower piston 42ª, along with the upper piston 33ª and the transfer tube 41ª, creates a vacuum in the metering chamber 32ª which causes check valve 48ª to be unseated and allows chemical solution to be drawn from the storage tank upward through the conduit 16ª, the passage 52ª in the fitting 51ª, the valve chamber 47ª and the passage 45ª and radial openings 46ª into the chamber 32ª. The metering chamber is of a size to provide the quantity of solution to be fed to the softener in any one regeneration cycle. When the refill valve closes, any pressure in the conduits 13ª and 74 and the upper chamber 31ª is bled off into the brine tank through the refill flow control. The feeder is then ready for the next regeneration cycle.

Having thus disclosed the invention, I claim:

1. A metering device for a chemical solution to be interposed in a conduit having liquid flow therethrough, comprising a cylindrical body having a closed upper end with a fitting therein connected into said conduit so that flow through said conduit communicates with said body, a central partition in the cylindrical body to form an upper chamber above the partition and a metering chamber below the partition, a first piston reciprocable in the upper chamber and a second piston reciprocable in the metering chamber and forming a movable bottom wall therefor, said first piston having a central passage therethrough, a check valve in said passage, a tubular member extending through the partition and rigidly connecting the pistons together, said tubular member forming a passage communicating at one end with the metering chamber and at the opposite end with the central passage in said first piston, a fitting on the lower end of the second piston, said second piston having a passage communicating between the last mentioned fitting and the metering chamber, a second check valve in said passage in the second piston, said last mentioned fitting communicating with a source of chemical solution, and means urging the first piston upwards in the upper chamber.

2. A metering device as set forth in claim 1, including a third valve in the metering chamber comprising an annular projection on the upper surface of said second piston and a resilient annular valve seat on the lower surface of the central partition, said projection engaging said valve seat when the pistons are in their uppermost positions.

3. A metering device as set forth in claim 1, in which said means urging the first piston upwards is a compression spring positioned between the first piston and the central partition, and the cylindrical body has an air vent adjacent to and above the partition but below said first piston.

4. A metering device as set forth in claim 1, in which said first and second pistons each has a radial flange in sealing wiping contact with the inner wall of the cylindrical body.

5. A metering device as set forth in claim 1, in which said tubular member is secured at its lower end in the upper surface of said second piston and has radial ports therein adjacent the piston communicating with the metering chamber.

6. A metering device as set forth in claim 1, in which said pistons move downward against the force of said urging means under high pressure in the upper chamber, movement of the second piston resulting in a vacuum in the metering chamber which draws chemical solution thereinto, said pistons move upward under intermediate pressure in the upper chamber transferring the metered solution from the metering chamber into the upper chamber through the tubular member and upper piston, and under a vacuum in the upper chamber the chemical solution is drawn out of the upper chamber, and the third valve retains the tubular member and metering chamber closed from communication with the upper chamber.

7. A metering chamber as set forth in claim 1, in which said passage in the second piston has a centrally located valve chamber for said second check valve, and the passage extends from said valve chamber to position at the upper surface of the second piston offset from the tubular member.

8. A metering device as set forth in claim 2, in which the first and second check valves and the third valve all operate independently of each other.

9. A metering device as set forth in claim 1, in which said central partition is generally cup-shaped with an annular upwardly projecting flange defining a central opening for said tubular member, and said urging means comprises a compression spring encompassing the tubular member and the central annular flange and abutting the partition and the first piston.

10. A metering device as set forth in claim 1, including a third valve in the upper chamber comprising an annular projection on the inner surface of said closed upper end of the body and a resilient annular valve seat on the upper surface of the first piston surrounding the central passage therein.

11. A metering device as set forth in claim 1, in which said means urging the first piston upwards includes a lateral passage in said body and partition communicating with said upper chamber below said first piston, and a conduit communicating with an intermittent source of fluid pressure.

12. A metering device as set forth in claim 11, in which said pistons move downward under high pressure in the upper chamber, movement of the first piston forcing liquid from below said piston out the lateral passage and movement of the second piston resulting in a vacuum in the metering chamber which draws chemical solution thereinto, said pistons initiate upward movement under pressure exerted through said lateral passage and move upwardly under fluid pressure below said first piston and a reduced pressure above said first piston transferring the metered solution from the metering chamber into the upper chamber and directly out of the fitting.

13. A metering device as set forth in claim 10, in which said third valve closes the outlet from the central passage in the first piston and the central passage in said tubular member when the first piston is in its upper position.

14. A metering chamber as set forth in claim 1, in which said passage in the second piston as a centrally located valve chamber for said second check valve and communicates with the passage in said tubular member.

No references cited.

WILLIAM F. O'DEA, *Primary Examiner.*

WILLIAM H. WRIGHT, *Assistant Examiner.*

U.S. Cl. X.R.

103—48; 137—99, 101.11, 103, 538